(12) United States Patent
Ramsey et al.

(10) Patent No.: US 11,226,992 B1
(45) Date of Patent: Jan. 18, 2022

(54) DYNAMIC DATA CLUSTERING

(71) Applicant: Kensho Technologies, LLC, Cambridge, MA (US)

(72) Inventors: Michael William Ramsey, Arlington, VA (US); Justin Clay Austin, Arlington, VA (US)

(73) Assignee: Kensho Technologies, LLC, Cambridge, MA (US)

( * ) Notice: Subject to any disclaimer, the term of this patent is extended or adjusted under 35 U.S.C. 154(b) by 58 days.

(21) Appl. No.: 16/524,976

(22) Filed: Jul. 29, 2019

(51) Int. Cl.
*G06F 17/00* (2019.01)
*G06F 16/28* (2019.01)

(52) U.S. Cl.
CPC .................... *G06F 16/285* (2019.01)

(58) Field of Classification Search
CPC .................................... G06F 16/285
See application file for complete search history.

(56) References Cited

U.S. PATENT DOCUMENTS

| 9,703,856 | B2* | 7/2017 | Tyercha | G06F 16/221 |
|---|---|---|---|---|
| 10,691,664 | B1* | 6/2020 | Yap | G06F 16/23 |
| 2018/0032579 | A1* | 2/2018 | Higuchi | G06K 9/6219 |

OTHER PUBLICATIONS

T. F. Gharib, M. M. Fouad and M. M. Aref, "Web document clustering approach using wordnet lexical categories and fuzzy clustering," 2008 11th International Conference on Computer and Information Technology, Khulna, Bangladesh, 2008, pp. 48-55, doi: 10.1109/ICCITECHN.2008.4803109, Dec. (Year: 2008).*

M. Friedman, M. Last, O. Zaafrany, M. Schneider and A. Kandel, "A new approach for fuzzy clustering of Web documents," 2004 IEEE International Conference on Fuzzy Systems (IEEE Cat. No.04CH37542), Budapest, Hungary, 2004, pp. 377-381 vol. 1, doi: 10.1109/FUZZY.2004.1375752, Jul. (Year: 2004).*

Aggarwal et al., "A Framework for Clustering Evolving Data Streams," Presented at Proceedings of the 29th International Conference of Very Large Data Bases, Berlin, Germany, Sep. 9-12, 2003; Proceedings of the 29th International Conference of Very Large Data Bases, Dec. 2, 2003; pp. 81-92.

Auvolat et al., "Clustering is Efficient for Approximate Maximum Inner Product Search," arXiv:1507.05910v3, Jul. 21, 2015, 10 pages.

Bentley, Jon Louis, "Multidimensional Binary Search Trees Used for Associative Searching," Communication of the ACM, Sep. 1975, 18(9): pp. 509-517.

(Continued)

*Primary Examiner* — Greta L Robinson
(74) *Attorney, Agent, or Firm* — Fish & Richardson P.C.

(57) ABSTRACT

Methods and systems for dynamic data clustering. One of the methods includes: i) receiving a vector representing a (data) item; in response to receiving the vector: a) obtaining clusters within at least one specified metric of the vector to determine a neighborhood of clusters; b) filtering the neighborhood of clusters based at least in part on an age parameter of the clusters to determine whether there are filtered clusters; c) creating a new cluster based at least in part on the item when there are no filtered clusters; and d) storing the new cluster data for the new cluster, wherein the obtaining, filtering, creating and storing steps are performed in near real-time from receipt of the vector; ii) receiving a request for cluster data; and iii) providing cluster data including the new cluster data in response to the request.

21 Claims, 6 Drawing Sheets

(56) References Cited

OTHER PUBLICATIONS

Cao et al., "Density-Based Clustering over an Evolving Data Stream with Noise," Presented at Proceedings of the Society of Industrial and Applied Mathematics International Conference on Data Mining, Bethesda, Maryland, Apr. 20-22, 2006; Proceedings of the 6th SIAM International Conference on Data Mining, Apr. 2006; pp. 326-337.
Github.com [online], "facebookresearch/faiss," retrieved on Feb. 21, 2020, retrieved from URL<https://github.com/facebookresearch/faiss>, 5 pages.
Github.com [online], "leonsim/simhash," retrieved on Feb. 21, 2020, retrieved from URL<https://github.com/leonsim/simhash>, 1 page.
Github.com [online], "spotify/annoy," retrieved on Feb. 21, 2020, retrieved from URL<https://github.com/spotify/annoy>, 6 pages.
Hahsler, Michael, "Clustering Data Streams Based on Shared Density Between Micro-Clusters," IEEE Transactions on Knowledge and Data Engineering ,Jun. 2016, 28(6): pp. 1449-1461.
Hbdscan, "The hbdscan Clustering Library," retrieved on Feb. 21, 2020, retrieved from URL<https://hdbscan.readthedocs.io/en/latest/index.html>, 3 pages.
Kleinberg, Jon, "An Impossibility Theorem for Clustering," Presented at Proceeding of the Conference and Workshop on Neural Information Processing Systems, Dec. 2002; Advances in Neural Information Processing Systems 15, Sep. 2003, 8 pages.
SciPy.org [online], "Hierarchical clustering (scipy.cluster.hierarchy)," last updated Dec. 19, 2019, retrieved on Feb. 21, 2020, retrieved from URL<https://docs.scipy.org/doc/scipy/reference/cluster.hierarchy.html>, 4 pages.
Singh et al., "Detecting Near-Duplicates for Web Crawling," Presented at Proceedings of WWW'07: 16th International Conference on World Wide Web, Alberta, Canada, May 2007; Proceedings of the 16th International Conference on World Wide Web, 2007: pp. 141-149.
Wisc.edu [online], "Index of/~vganti/birchcode," retrieved on Feb. 21, 2020, retrieved from URL <http://pages.cs.wisc.edu/~vganti/birchcode/>, 1 page.
Zhang et al., "BIRCH: A New Data Clustering Algorithm and Its Applications," Data Mining and Knowledge Discovery, Jun. 1997, 1: pp. 141-182.

\* cited by examiner

| order | cluster | total drift | dist | drift | dispersion | item | item_desc (article title) |
|---|---|---|---|---|---|---|---|
| This is the order in which the item was added to the cluster. | Unique identifier for the cluster. | The amount the cluster's centroid has moved since the cluster's founding. | The distance the item was from the centroid when it was added to the cluster. | The amount the new item moves the cluster's centroid. | A measure of how much the cluster's points are spread out. | Unique identifier for the item being clustered. | A text description of the item being clustered. In this case, the items are articles and so the description is the beginning of the article's title. |
| 0 | dd71 | 0.528 | 0.000 | 0.0000 | 0.000 | 4a1b | His power under threat, Maduro pummels slums |
| 1 | dd71 | 0.528 | 1.036 | 0.3454 | 0.239 | 1514 | Nicolas Maduro of Venezuela Says He's Open to Talk |
| 2 | dd71 | 0.528 | 0.715 | 0.1021 | 0.267 | acb8 | Opposition protesters fill streets of Venezuelan c |
| 3 | dd71 | 0.528 | 0.622 | 0.0415 | 0.273 | 59bc | Maduro Sounds Conciliatory but Warns U.S. Interve |
| 4 | dd71 | 0.528 | 0.645 | 0.0238 | 0.278 | 5127 | Maduro Turns to Special Police Force to Crush Diss |
| 5 | dd71 | 0.528 | 0.484 | 0.0077 | 0.277 | e545 | Guaido calls for protests, while Maduro offers dia |
| 6 | dd71 | 0.528 | 0.639 | 0.0050 | 0.278 | dd67 | Scenes from a protest: Venezuelans fill streets of |
| 7 | dd71 | 0.528 | 0.672 | 0.0026 | 0.278 | cd84 | Juan Guaido Says Venezuelan Opposition Had Secret |
| 8 | dd71 | 0.528 | 0.621 | 0.0012 | 0.279 | 84ab | Guaido to police: Don't cross red line with my fam |
| 9 | dd71 | 0.528 | 0.686 | 0.0006 | 0.279 | 0cc8 | Venezuela opposition leader to police: Leave my fa |
| 0 | 3992 | 0.509 | 0.000 | 0.0000 | 0.000 | cd9a | Why Some Are Happy With Amazon's Decision to Pull |
| 1 | 3992 | 0.509 | 0.986 | 0.3287 | 0.216 | 6e02 | Amazon canceling plans to build NYC headquarters |
| 2 | 3992 | 0.509 | 0.655 | 0.0936 | 0.238 | 5e24 | New York's politicians thought they could bribe Am |

FIG. 4A

| Unique identifier for the cluster. | The unique identifier for the founding item of the cluster. | How many items are in the cluster. | The amount the cluster's centroid has moved since the cluster's founding. | A measure of how much the cluster's points are spread out. | | The variance of the centroid vector. | The centroid's vector. |
|---|---|---|---|---|---|---|---|
| cluster | founding | cardinality | drift | dispersion | variance | centroid | |
| b476 | ed9e | 306 | 0.43 | 0.20 | [9.00086977 0.00086768 0.00088722 0.0011421&] | [ 0.5391188 | -0.1546&444 -0.1101&254 -0.0&36338] |
| bc87 | 0851 | 103 | 0.44 | 0.20 | [0.0018878 0.00034002 0.00013424 0.0&013234] | [ 0.2275759 | -0.0&626579 -0.0&58&84& -0.0472418] |
| 38d6 | 4f79 | 97 | 0.38 | 0.15 | [7.00198738e-04 1.48084S9e-04 8.612830&e-05 1.178704&1e-05] | [ 0.3376943 | -0.1427419 -0.10&59671 -0.07559&884] |
| 65b5 | 5a25 | 74 | 0.43 | 0.22 | [0.0015220S 0.00023674 0.00038193 0.00017799] | [ 0.3888&078 | -0.1653045 -0.1300782&1 -0.0827886] |
| c6ba | a&d1 | 74 | 0.19 | 0.08 | [7.687875&e-04 5.860457&e-04 3.80264&5&e-05 2.12&4801e-05] | [ 0.331948&2 | -0.0378&&96 -0.0801759& -0.053&2&44] |
| 1eee | 075c | 86 | 0.46 | 0.22 | [3.9843&&&e-04 5.3786615e-05 1.1712&5&e-04 2.810&&61e-05] | [ 0.3322221& | -0.106&2427 -0.0&14572&3 -0.06&4676] |
| 97d7 | 69a7 | 62 | 0.34 | 0.12 | [9.00847&00 0.001189&9 0.000&2&84 0.000406&4] | [ 0.3&3&16 | -0.151121&5 -0.110&76&& -0.0&1&337 ] |

FIG. 4B

DYNAMIC DATA CLUSTERING

BACKGROUND

Technical Field

This specification relates to data stream clustering.

Background

In computer science, data stream clustering can be defined as the clustering of data items that arrive continuously such as telephone records, multimedia data, and financial transactions.

Evaluation (or "validation") of clustering results is difficult. Popular approaches involve "internal" evaluation, where the clustering is summarized to a single quality score (such as the Silhouette Score described below), "external" evaluation, where the clustering is compared to an existing "ground truth" classification, "manual" evaluation by a human expert, and "indirect" evaluation by evaluating the utility of the clustering in its intended application.

Silhouette Score is a measure of how similar an object is to its own cluster (cohesion) compared to other clusters (separation). The silhouette score can range from −1 to +1, where a high value indicates that the object is well matched to its own cluster and poorly matched to neighboring clusters. If most objects have a high value, then the clustering configuration is appropriate. If many points have a low or negative value, then the clustering configuration may have too many or too few clusters.

SUMMARY

This specification describes technologies for dynamic data clustering. One objective of data clustering is to construct an effective clustering of the stream using a relatively small amount of memory and time. Implementations benefit from low memory usage because hosting dynamic clustering applications are more cost efficient if the infrastructure has a smaller footprint. Implementations of dynamic clustering benefit from low latency between arriving data and cluster results (e.g., news articles being published and then being clustered and displayed to a user in a web application benefit from low latency between arriving news articles and displayed cluster results).

Consider items entering a system sequentially, one-by-one, and the system has no knowledge of items that have not yet arrived. One can then define the Data Stream Clustering (DSC) problem as follows. As each item arrives, produce clusters that identify and track thematically related items as the themes develop over time.

To unpack this definition, consider the following example. Suppose the items are academic papers arriving in publication order and one wants to cluster the papers according to their overall discipline. The individual papers are the items, the arrival time for each paper can be its publication date, and the themes one wants to identify and track can be the academic discipline of each paper.

For any fixed slice of time, say a year, this would be a standard clustering (topic modeling) problem. However, there are two key problems. First, the "as each item arrives" requirement prevents one from batching papers into slices or looking into the future to cluster all papers in one batch at a time. Second, the disciplines (themes) are changing and drifting over time, so the clusters need to adapt to this drift.

For example, currently, mathematics and computer science are two distinct disciplines, but in the early 20th century, there was primarily only mathematics. The goal of DSC in this scenario is to cluster mathematics papers together over the whole time period and to branch off and create a new computer science cluster once there is a clear divergence. Conversely, terrestrial and celestial mechanics were originally very different academic fields that eventually converged into a single theme. DSC algorithms tend to address these issues by assuming some cluster mechanism and then integrating new observations into previous clusters by identifying emerging clusters and removing outdated clusters incrementally.

There is also a need for real-time news article deduplication and story tracking. Articles need deduplication because news outlets often reprint stories from each other and from wire services. Further, outlets will often publish incremental updates to their own stories. For many purposes, users will want to consider reprints or updates to a single report to be the same news report. Therefore, as articles are published, they need to be clustered by their underlying news reports. In the case where genuinely different news reports are published on the same or a developing story, more articles can accrue than humans can process. To help individuals process world events, then, it helps to have news reports clustered by their underlying stories or events.

Approaches to the DSC problem can have one or more of the following attributes.

- The clustering problem does not necessarily have an optimal solution. One does not necessarily have to create an optimal clustering.
- Implementations of a DSC system described in this specification can be agnostic to the meaning of the supplied items and can work with their provided representations. Therefore, assigning meaning to, or summaries of, the clusters can be left to the user.
- The generation of item representations can be left to the user and the system can assume such item representations will be provided.
- A DSC system described in this specification can incorporate similarity search indices and one or more of a variety of clustering algorithms.

In general, one innovative aspect of the subject matter described in this specification can be embodied in methods that include the actions of: i) receiving a vector representing a (data) item; in response to receiving the vector: a) obtaining clusters within at least one specified metric of the vector to determine a neighborhood of clusters; b) filtering the neighborhood of clusters based at least in part on an age parameter of the clusters to determine whether there are filtered clusters; c) creating a new cluster based at least in part on the item when there are no filtered clusters; and d) storing the new cluster data for the new cluster, wherein the obtaining, filtering, creating and storing steps are performed in near real-time from receipt of the vector; ii) receiving a request for cluster data; and iii) providing cluster data including the new cluster data in response to the request. For certain applications such as dynamic clustering of news articles, the clustering and storing steps are performed in less than a second and in certain implementations can be performed in approximately 5 milliseconds or less.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The item can be a data item, such as a news article. Obtaining clusters within at least one specified metric of the vector can include querying a centroid similarity search index with the vector to find clusters within a specified distance of the vector. Supplying a standardized input to at least one of the centroid similarity search index and a clustering module can allow the exchange of at least one of the centroid similarity search index and the clustering module without needing to modify other steps. The specified distance can be a Euclidean distance. The specified distance can be a cosine similarity. An age parameter of a cluster can be the most recent time that a vector of an item was added to the cluster.

The method can include adding the vector to a filtered cluster that is the most similar of the filtered clusters to the vector. Each of the filtered clusters can have a centroid and determining which of the filtered clusters is most similar to the vector can include determining which of the centroids of the filtered clusters is closest to the vector. The method can further include adding the vector to a filtered cluster that has the smallest distance of the filtered clusters to the vector when there is at least one filtered cluster. Each filtered cluster can have a centroid and determining which of the filtered clusters has a smallest distance of the filtered clusters to the vector can include determining which of the centroids of the filtered clusters has the smallest distance to the vector.

The new cluster can have a new cluster centroid and creating a new cluster can include adding the new cluster centroid to a centroid similarity search index using the vector of the item as the new cluster centroid and creating a new cluster can further include reassigning an old item having a current cluster with a current cluster centroid, the reassigning occurring when the item is closer to the new cluster centroid than to the current cluster centroid.

The method can further include merging clusters in the neighborhood of clusters that are closer than a specified distance and splitting clusters in the neighborhood of clusters that have a radius above a specified metric. The method can further include: receiving an update to an old item turning the old item into a new item; determining an existing cluster for the old item; removing the old item from the existing cluster; applying a clustering module to the items remaining in the existing cluster; and adding the new item to a new cluster. The method can further include providing an administrator with cluster membership data and receiving clustering parameters from the administrator after providing the administrator with the cluster membership data. The obtaining, filtering, creating and storing steps can be performed only upon receipt of an item. The obtaining, filtering, creating and storing steps can be performed in less than a second or in less than 5 milliseconds.

The subject matter described in this specification can be implemented in particular embodiments so as to realize one or more of the following advantages. Implementations of the dynamic data clustering system described in this specification provide a full-feature, fully online streaming data clustering approach, in general, and a fully online, distance (and centroid) based, sliding time window, with competitive learning, approach, in particular. The system can implement each of its components in a lazy manner, i.e., computations are performed as needed. This makes implementations of the DSC system fully online with no offline clustering components. Thus, as soon as each data item is processed, clusters are up-to-date and ready for the user. Users do not have to choose between instantly getting the micro state or waiting for an offline component to finish to obtain macro state data.

The system is modular, allowing the user to swap out different similarity search indices or 2nd-stage clustering algorithms. Modularity gives the user the ability to adapt the system to their specific needs.

1. Index Performance: Some indices can use GPUs or multiple CPUs. Some indices are inherently faster than others, often with some increase in error. The user can manage these tradeoffs based on their needs.
2. Cluster Quality: The structure of clusters can vary widely by domain or dataset. By changing the 2nd-stage cluster approach, users can adapt to their specific problem. For example, if clusters are likely not to be spherical, a user could switch to DBSCAN.

Implementations of a dynamic data clustering system allow for:

1. Saving the cluster state to disk at any point and then restarting from that saved state.
2. Updating clusters when the representation of an earlier item needs to be changed, possibly due to an error in the original stream or new information about the item.
3. Efficiently viewing and/or resetting the cluster state to an arbitrary date and time in the past.
4. Adjusting and tuning each major step or component to application specific needs.
5. Summarizing cluster membership and statistics over time.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4A is an example of a table summarizing cluster membership and statistics over time.

DETAILED DESCRIPTION

This specification describes technologies for dynamic data clustering.

Stream clustering methods can utilize two steps: an online step and an offline step. The second step is usually not considered time-critical, which allows the use of standard offline clustering approaches.

In two-step stream clustering, an online component evaluates arriving data points in real time and generates preliminary micro-clusters. The number of micro-clusters is much smaller than the number of data points in the stream but larger than the final number of clusters. This gives sufficient flexibility to merge or split clusters. Upon request, an offline component then 'reclusters' the micro-clusters to derive a final set of macro-clusters.

In contrast to such two-step clustering approaches, one implementation of a dynamic clustering system described in this specification uses a custom fully online, distance (and centroid) based approach with a sliding time window and with a competitive learning approach. Notably, implementations can be lazy, i.e., computations are performed as needed. So-called lazy implementations make the system 100 fully online with no offline clustering components. This means that as soon as each data item is processed, clusters are up-to-date and ready for a user. Further, implementations of the dynamic data clustering system are modular, allowing a user to swap out certain components, e.g., different similarity search indices or clustering approaches. This modularity gives users the ability to adapt the system to their specific needs.

One modular implementation exposes interfaces that users can utilize for the similarity search index and the clustering approach.

A Similarity Search Index Interface can be implemented for a specified index (e.g., the FAISS index, a library for efficient similarity search and clustering of dense vectors). The requirements from this interface are the ability to add a new vector and associated ID to the index, the ability to remove a vector from the index given its ID, and the ability to query the index for the nearest/most similar vectors to an input vector.

The system can have an Online Lazy Clustering Interface where the interface provides: 1) the ability to determine if the clustering should occur on a subset of clusters/items within the larger set of clusters; and 2) the ability to cluster a set of clusters/items into another set of clusters.

Figure 1:
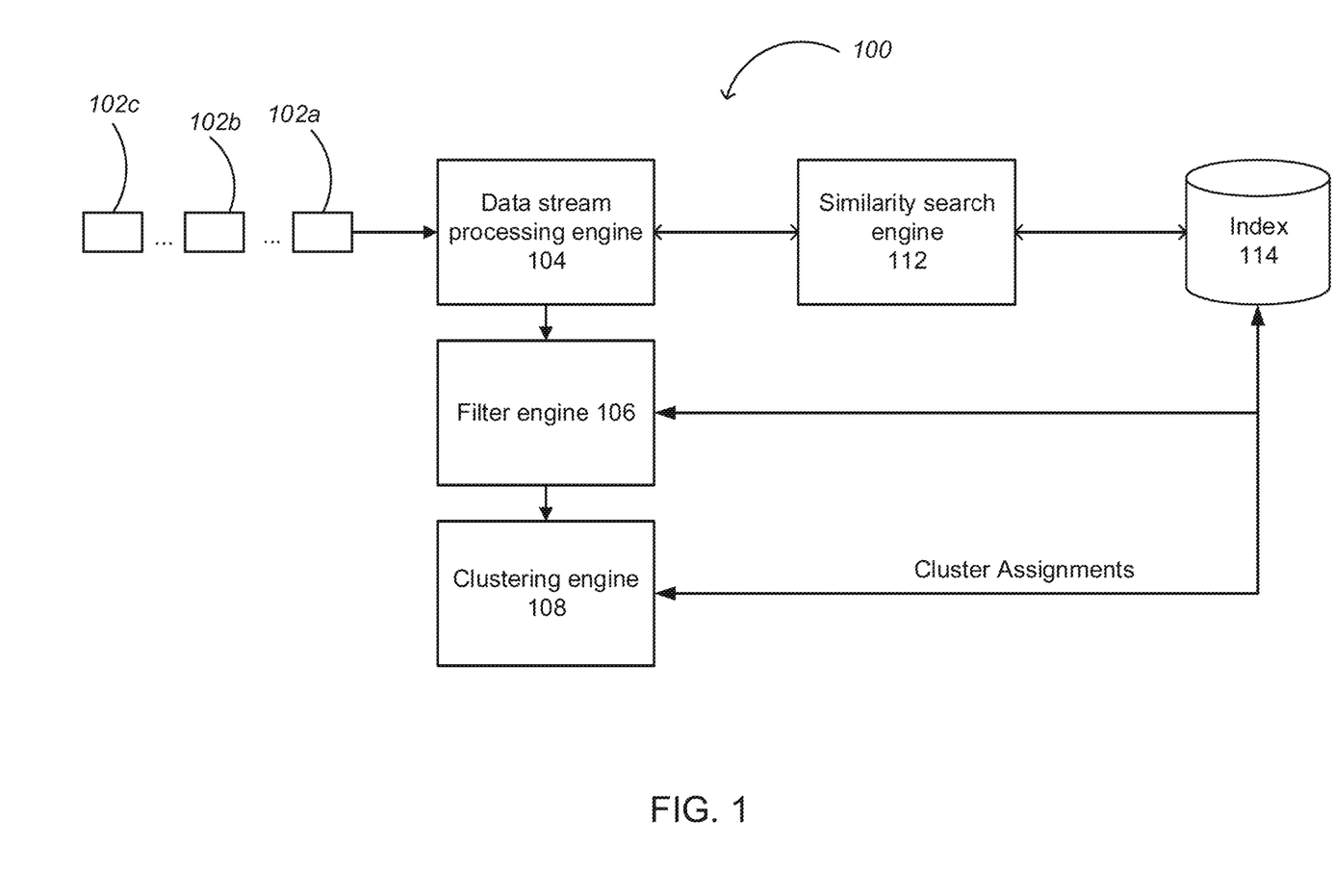
FIG. 1 is a block diagram showing components of one example a dynamic clustering system.

FIG. 1 shows an example dynamic data clustering system 100. As illustrated in FIG. 1, data items such as data items 102a, 102b, 102c arrive in a stream, i.e., spaced out in time (data item 102a arrives, followed shortly in time by data item 102b, followed shortly in time by item 102c), at the dynamic data clustering system 100, e.g., at data stream processing engine 104.

In terms of what constitutes a data stream, in many examples, there isn't a set inter-arrival time which defines intermittently arriving data as streaming data. The more of the following bulleted characteristics that are present in a particular situation, the more there is a streaming data problem that an implementation of a dynamic clustering engine described in this specification can solve. Not all of the following characteristics are required for a data streaming problem to exist.

The items in a data stream are processed as they arrive and are not stored in memory.

The stream is not interrupted to process the items—there is limited time (e.g., seconds or sub-seconds) before the next item arrives.

An updated clustering of the stream is needed before the next item arrives.

The order in which items arrive can affect the structure of the resulting clusters.

There is no a priori information on the number of clusters in the stream and the true number may change over time.

Items that previously arrived might be recalled and updated at any point, requiring the clusters to be updated in a consistent manner.

There is no logical, a priori chunking of the items in the stream.

The problem of how to handle items that arrive simultaneously can usually be solved by picking an order. In other words, one implementation can pick an order for arriving data items when the items arrive simultaneously.

In one implementation the data items arrive at a data stream processing engine 104. In addition to the data stream processing engine 104, the dynamic clustering system 100 includes a filter engine 106, a clustering engine 108 and a similarity search engine 112. In addition, the system 100 can include an index database 114 in communication with the filter engine 106, the clustering engine 108 and the similarity search engine 112.

Implementations of a dynamic data clustering system can make use of one or more of the following three components. These components can be swapped out for alternatives as needed.

1. An updateable similarity search index for centroid nearest neighbor queries—such as FAISS or SimHash index (both described further below).
2. A dedicated clustering algorithm to handle reclustering clusters—such as HDBSCAN (the hdbscan library is a suite of tools that use unsupervised learning to find clusters, or dense regions, of a dataset) or hierarchical clustering.
3. A centroid update mechanism such as a weighted average or exponential moving average of the item representation.

Figure 2A:
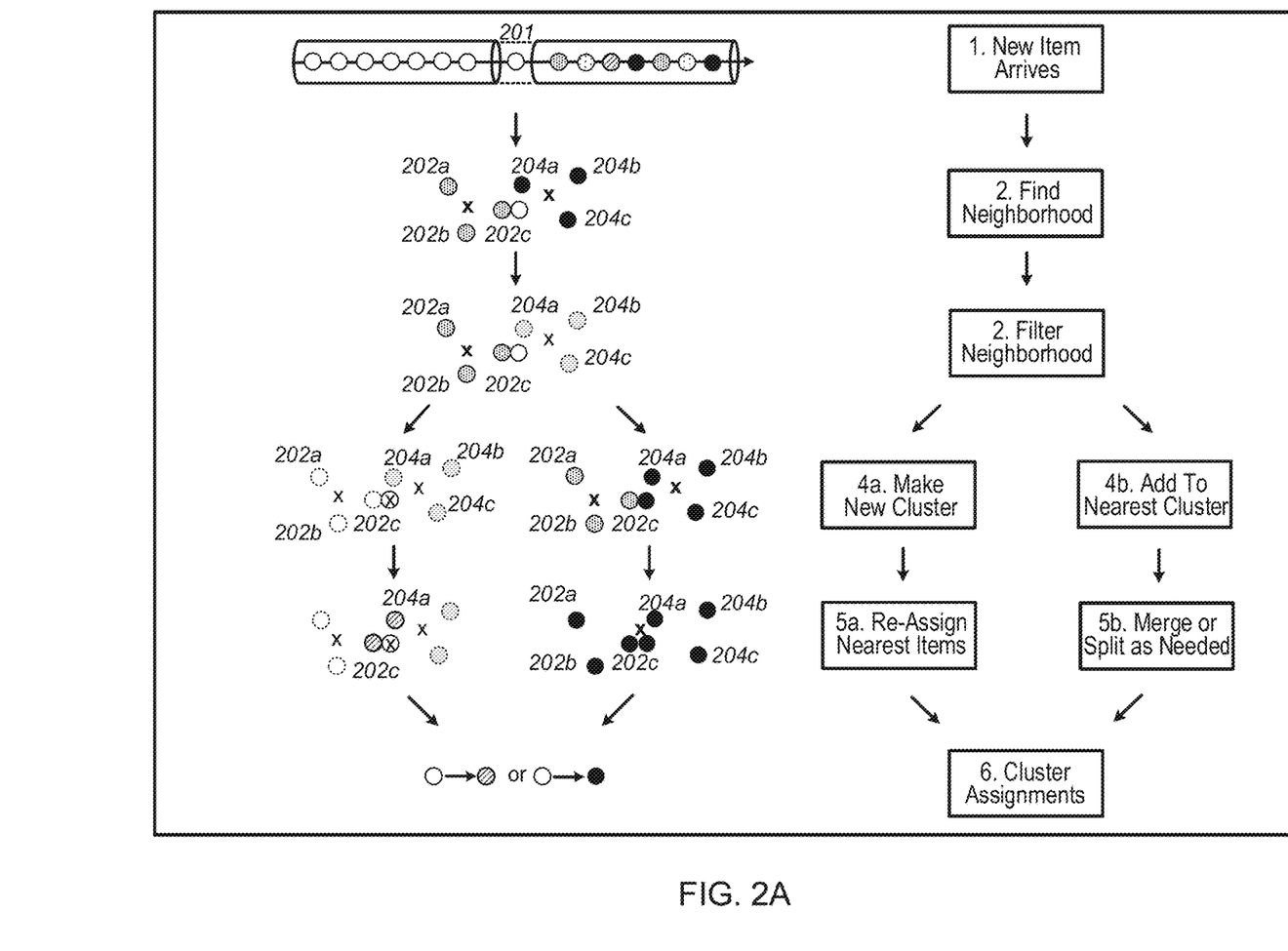
FIG. 2A is a diagram illustrating one example of a dynamic clustering process.

FIG. 2A is a diagram illustrating one example of a dynamic clustering process including 6 steps. The left side of the diagram illustrates each step with exemplary data and the right side details the corresponding steps in prose.

1. With reference to FIG. 2A, new items arrive in the data stream 201 one by one, each data item in the form of a vector. The data stream 201 shown on the left depicts data items arriving over a period of time, each sphere representing a data item and the earliest in time on the right side and the latest in time on the left side. The gap in the pipe shows the data item that is currently arriving at the dynamic clustering system. In one implementation, each vector is processed immediately when it arrives. Given a current vector to be processed, implementations of the dynamic clustering process assign a cluster identifier to the vector.
2. The process then queries a centroid similarity search index with the input vector to find clusters closest to the input vector. The index is built with all the cluster centroids and will return either k-NN or range-NN results (both described further below) depending on user supplied parameters (e.g., the k nearest neighbors or the range over which to search for nearest neighbors). One can refer to the set of clusters returned as the neighborhood of the query vector. In the illustrated example on the left side of FIG. 2A, two clusters are shown: cluster 202 (including data items 202a, 202b, and 202c and having a centroid marked by an "x") and cluster 204 (including data items 204a, 204b, and 204c and having a centroid marked by an "x").
3. An implementation of the process then filters the neighborhood based on the certain criteria. For example, the process can remove outlier centroids (possibly obtained from a k-NN search) where the returned centroids are too far from the query vector.

The process can remove old clusters that have not added an item recently. In the illustrated example on the left side of FIG. 2A, one or both of the clusters 202 and 204 could be filtered out of consideration. In one implementation, the process can filter out clusters in the neighborhood that are outside of the range parameter used for range search. A time filter can remove and archive clusters in the neighborhood if the newest item in a cluster is at least one day older than the new item that the NERD process is clustering. As a simple example: If the item the NERD process is clustering is dated for 6/17 12:00, and the neighborhood consists of clusters A, B, and C with timestamps 6/15 2:00, 6/17 11:00, and 6/17 10:00 respectively, the NERD process can filter out and archive cluster A using the above parameters. Subsequent NERD process steps and clustering would only apply to clusters B and C.

4. If no clusters survive the filtering step (e.g., in the illustrated example on the left side of FIG. 2A, if neither cluster 202 or cluster 204 survive the filtering step) including the case that a NN search returns an empty set, then the process can make a new cluster in step 4a below, otherwise the process can add the query item to the most similar remaining cluster in step 4b below.
   a. If no clusters survive the filtering step (as shown on the left branch of the left side of FIG. 2A and as indicated by showing the clusters 202 and 204 in light shading), the process adds a new cluster to the centroid similarity search index, e.g., using the query item's vector as the founding centroid.
   b. If at least one pre-existing cluster survives the filtering step, the process adds the query item to the pre-existing cluster that has the minimum distance or maximum similarity between the item's vector and the cluster's centroid. In the illustrated example shown on the right branch of the left side of FIG. 2A, the query item is added to the cluster 204.

5. If the process created a new cluster in step 4, then the process reassigns nearby vectors in step 5a below, else if the process assigned the query data item to a pre-existing cluster in step 4, then the process merges or splits clusters in the neighborhood as needed in 5b below.
   a. If the process created a new cluster (having a new cluster centroid) in step 4, then the process can reassign items that are closer to the new cluster centroid than their currently assigned centroid. In the illustrated example shown in the left branch of the left side of FIG. 2A, data items 202c and 204a are reassigned to the new cluster.
   b. If the process added the query item to a pre-existing cluster, for all the clusters in the query's neighborhood, the process merges clusters whose centroids have drifted too close together and splits clusters that have become too heterogeneous. In the illustrated example shown in the right branch of the left side of FIG. 2A, cluster 202 is merged with cluster 204 and the centroid of the merged cluster is adjusted to take into account the data items newly added to the cluster.

6. The process then stores cluster assignments from step 5a or 5b and updates centroids in the similarity search index.

Figure 2B:
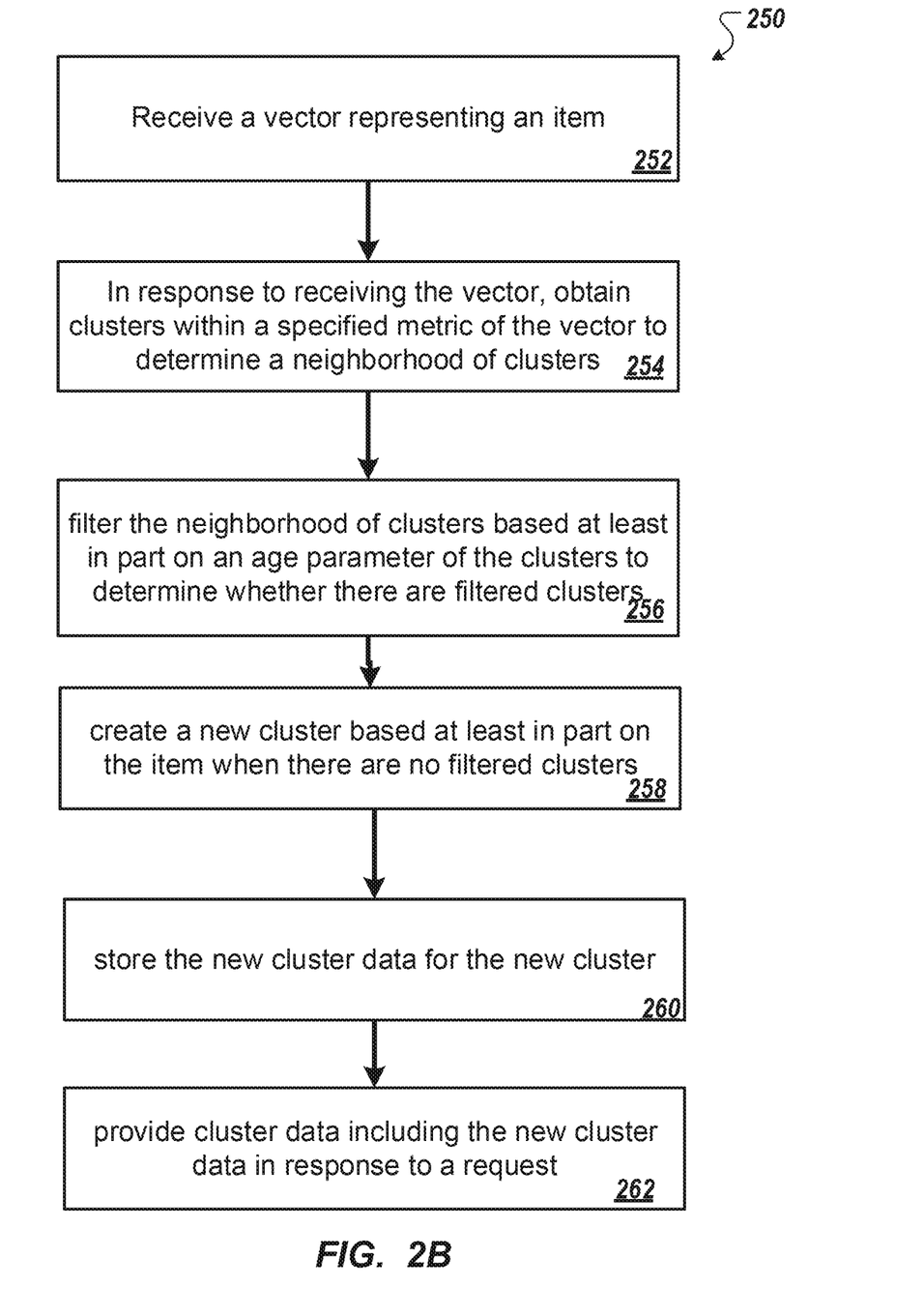
FIG. 2B is a diagram illustrating another example of a dynamic clustering process involving processing an item that has changed.

FIG. 2B is a flowchart of an example process 250 for dynamic clustering of a data stream. For convenience, the process 200 will be described as being performed by a system of one or more computers, located in one or more locations, and programmed appropriately in accordance with this specification. For example, a dynamic clustering system, e.g., the dynamic clustering system 100 of FIG. 1, appropriately programmed, can perform the process 250.

The exemplary process can include: receiving 252 a vector representing an item; in response to receiving the vector, obtaining 254 clusters within a specified metric (e.g., euclidean distance or cosine similarity) of the vector to determine a neighborhood of clusters; filtering 256 the neighborhood of clusters based at least in part on an age parameter of the clusters to determine whether there are filtered clusters; creating 258 a new cluster based at least in part on the item when there are no filtered clusters; storing 260 the new cluster data for the new cluster; and providing cluster data including the new cluster data in response to a request. The process can be repeated for a plurality of data items.

There are standard ways to create vectors representing data items from a data-stream There are standard ways to vectorize most of the items (e.g., images, documents) that are susceptible to the dynamic clustering described in this specification. Indeed there are tools to produce a vector representation of a data item from a data stream. Implementations of the dynamic clustering methods described in this specification can include receiving a data item in a data stream, producing a vector representation of the data item, and repeating that process for a plurality of data items.

Figure 3:
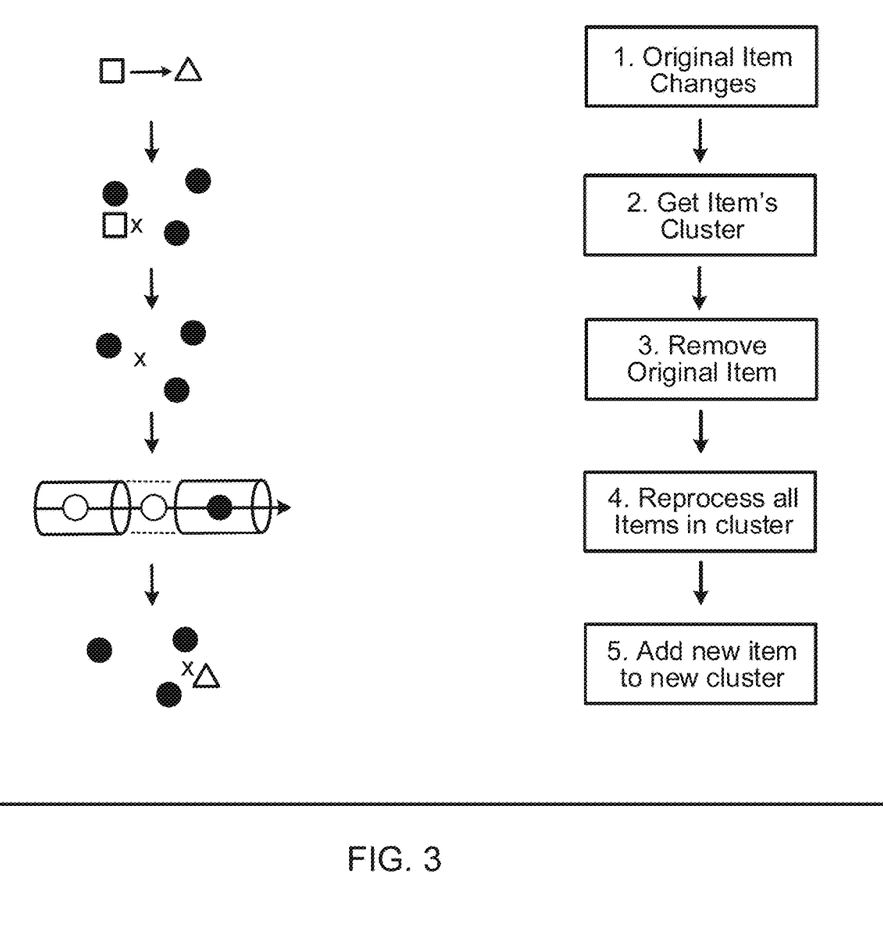
FIG. 3 is a diagram illustrating another example of a dynamic clustering process.

FIG. 3 is a diagram illustrating another example of a dynamic clustering process. As with FIG. 2A, the left side of FIG. 3 illustrates each step with exemplary data items and the right side details the corresponding steps in prose.

Implementations of a dynamic clustering system described in this specification can update clusters when the representation of an earlier data item needs is changed, possibly due to an error in the original stream or a data source provides new information about the data item. This update process can consist of the following steps.
   1. A user or data source can initiate an update with a change to a specific item.
   2. The process finds the item's cluster.
   3. If the item is the only member of the cluster, then the process delete the item and the cluster and the process is complete. Otherwise, the process stores the members of the cluster, minus the changed item, in memory and deletes the cluster.
   4. The process then reprocesses all the remaining items (i.e., the remaining former cluster members) by simulating their arrival into a new cluster without the updated item.
   5. After all the items (i.e., the former cluster members minus the updated item) are clustered (i.e., assigned to one or more clusters for example by using the processes described in FIG. 2A), the process of FIG. 3 then processes the updated data item as if it were a new item, according to the process described in FIG. 2A.

Implementations of a dynamic clustering system can also provide a rewind functionality. Such a rewind functionality allows both a view of the system state at some earlier time in the clustering process and for the user to reset the system state to some earlier time. An example of a rewind process can consist of the following steps.
   1. A user specifies a time in the past including whether the user wants to reset the system to that state.
   2. If the user wants to reset the system to that prior state, the process performs all subsequent operations in place and on the system's actual state. Otherwise, the process can make a copy of the system's current state and perform all subsequent operations on that copy.
3. The process can determine what items need to be removed based on an item's timestamp.
4. For each item to be removed in non-ascending order of timestamp, the process can find the item's cluster.
5. The process can remove the time-qualifying items from the item's cluster.
6. After the process removes the time-qualifying items, the process can update any necessary collection level metadata. Collection level metadata can include:
   a mapping from active cluster IDs to active cluster objects
   a mapping from archived cluster IDs to archived cluster objects
   a mapping from item IDs to cluster IDs where the cluster mapped to contains the item
   the total items in the collection
   the newest timestamp of all items in the collection
   a history of the inter-arrival time deltas of the collection, where the inter-arrival time delta for item X is the difference between the timestamp of X and the newest timestamp of the cluster that X was added to at the time X was added to it.

FIG. 4A is an example of a table summarizing cluster membership and statistics over time that implementations of a dynamic clustering system can provide. The table can include one or more of the following columns: the order in which the system added an item to a cluster; a unique identifier for the cluster; the amount the cluster's centroid has moved since it was created (one can refer to this movement as total drift); the distance the item was from the cluster centroid when the system added the item to the cluster; the amount the new item moves the centroid; a measure of how spread out a cluster's items are spread out (one can refer to this metric as dispersion); a unique identifier for the item being clustered; and a text description of the item being clustered (in the case of a stream of articles, the text description can be the beginning of the titles of the articles).

Figure 4B:
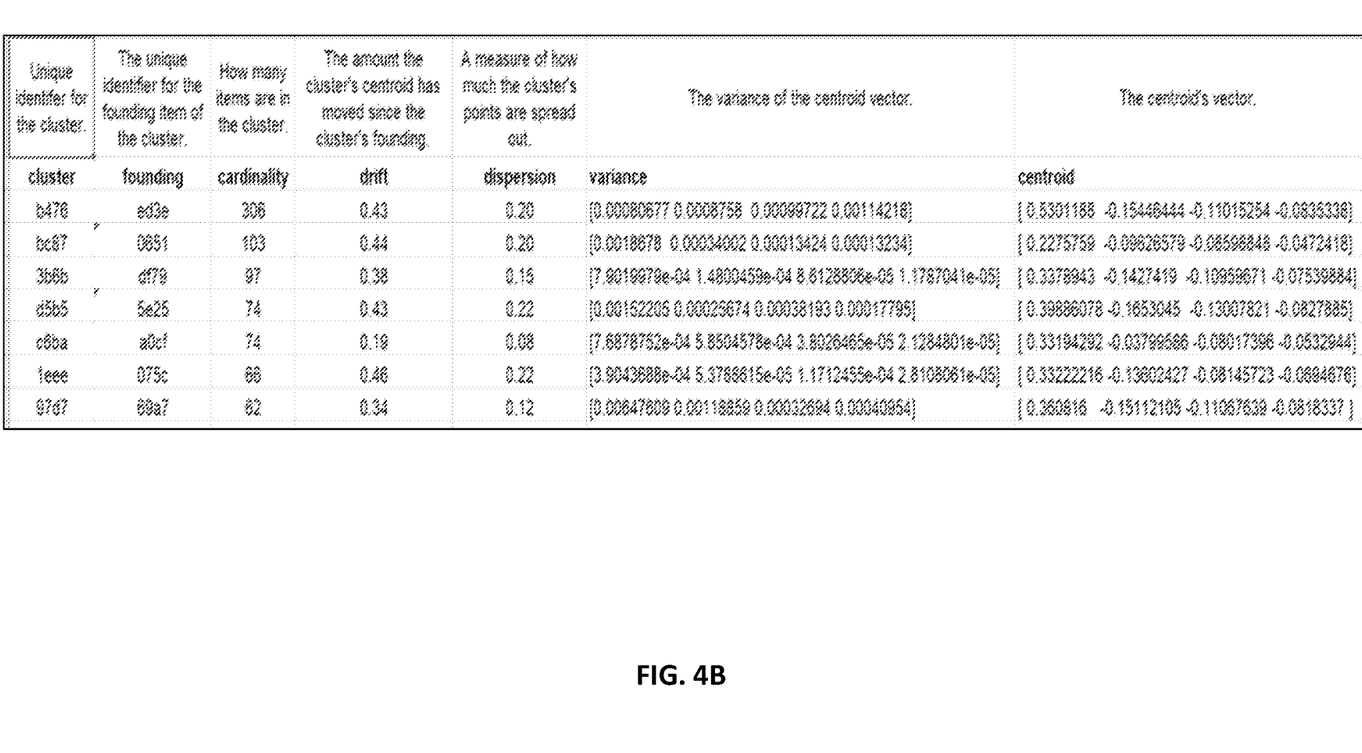
FIG. 4B is an example of a table summarizing statistics for a collection of clusters.

FIG. 4B is an example of a table summarizing statistics for a collection of clusters. The table can include one or more of the following columns: a unique identifier for the cluster; a unique identifier for the founding item of the cluster; how many items are in the cluster; the amount the cluster's centroid has moved since the cluster's founding; a measure of how spread out the cluster's members are (i.e., the dispersion of the cluster); the variance of the centroid vector; and the centroid's vector. The variance of the centroid vector can be understood in the following way: as the centroid is updated over time, the system can take the set of past centroids and compute the variance of the set (this can be thought of as a running variance).

As noted above, certain implementations of a dynamic data clustering system described in this specification are modular, allowing a user to swap out certain components, e.g., different similarity search indices or 2nd-stage clustering algorithms.

The nearest-neighbor (NN) search problem can be defined as follows: given a set S of points in a space M and a query point $q \in M$, find the closest point in S to q. Two direct generalizations of this problem are a k-NN search, where one is attempting to find the k closest points and range-NN search where one is attempting to find all the points within a radius r of the query point. A similarity function can be used in place of a distance function. In this case, the search problem is modified to find the point with the highest similarity score.

Example: M is taken to be the d-dimensional vector space where distance is measured using the Euclidean distance. A common alternative to a distance function is cosine similarity.

Definition: A similarity search index is an indexed database structure that performs k-NN and range-NN searches for items in its index and some predetermined similarity or distance function. Specifically, given a query vector, return the list of database objects that are most similar to this vector. If the index supports insertions and deletions without needing to be rebuilt from scratch, one can refer to the index as updatable.

Example: Faiss is a library for efficient similarity search and clustering of dense vectors. Faiss contains several methods for similarity search. It assumes that the instances are represented as vectors and are identified by an integer, and that the vectors can be compared with L2 distances (i.e., the Euclidean norm) or dot products. Vectors that are similar to a query vector are those that have the lowest L2 distance or the highest dot product with the query vector. Faiss approaches also support cosine similarity, since cosine similarity is a dot product on normalized vectors. Many of Faiss's indices are updatable.

Example: A k-d tree (short for k-dimensional tree) is a space-partitioning data structure for organizing points in a k-dimensional space. A KD tree is a binary tree structure which recursively partitions the parameter space along the data axes, dividing it into nested orthotropic regions into which data points are filed. The construction of a KD tree is fast because partitioning is performed only along the data axes, no D-dimensional distances need to be computed.

Once constructed, the nearest neighbor of a query point can be determined with only $O[\log(N)]$ distance computations. Though the KD tree approach is fast for low-dimensional (D<20) neighbors searches, it becomes inefficient as D grows larger than 20 neighbors. KD trees are not updatable and require the Euclidean distance function.

A k-d tree presorts n triangles prior to building the k-d tree, then builds the tree in $O(n \log n)$ time as a best case. An algorithm that builds a balanced k-d tree to sort points has a worst-case complexity of $O(kn \log n)$. This approach presorts n points in each of k dimensions using an $O(n \log n)$ sort such as Heapsort or Mergesort prior to building the tree. This approach can then maintain the order of these k presorts during tree construction and thereby avoid finding the median at each level of subdivision. In one implementation, anything <O(n) is fast.

Example: Annoy (Approximate Nearest Neighbors Oh Yeah) is a C++ library with Python bindings to search for points in space that are close to a given query point. It also creates large read-only file-based data structures that are stored so that many processes may share the same data. It supports Euclidean distance, Manhattan distance, and cosine distance, Hamming distance, or Dot (Inner) Product. Annoy is not updatable and only solves the NN search problem approximately.

Example: SimHash is a technique for quickly estimating how similar two sets are. A basic SimHash algorithm can return a hash of features mapped to specific bit positions. For example, three bit hashes 001 and 111 share one feature (the last one). Similarity between hashes can be calculated through Hamming distance, and the processing time for finding matches can be reduced by creating permutations of blocked bit positions. Updatable similarity search indices can be built using simhash.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving, using one or more computers, a vector representing an item;
   in response to receiving the vector:
   obtaining, using one or more computers, clusters within at least one specified metric of the vector to determine a neighborhood of clusters;
   filtering, using one or more computers, the neighborhood of clusters based at least in part on an age parameter of the clusters to determine whether there are filtered clusters;
   determining, using one or more computers and based on the received vector, that there are no filtered clusters;
   based on a determination that there are no filtered clusters, creating, using one or more computers, a new cluster based at least in part on the item; and
   storing, using one or more computers, new cluster data for the new cluster, wherein the obtaining, filtering, creating and storing steps are performed in near real-time from receipt of the vector;
   receiving, using one or more computers, a request for cluster data; and
   providing, using one or more computers, cluster data including the new cluster data in response to the request.

2. The method of claim 1, wherein the item is a news article.

3. The method of claim 1, wherein obtaining clusters within at least one specified metric of the vector comprises querying, using one or more computers, a centroid similarity search index with the vector to find clusters within a specified distance of the vector.

4. The method of claim 3, wherein the method comprises supplying, using one or more computers, a standardized input to at least one of the centroid similarity search index and a clustering module allowing, using one or more computers, exchange of at least one of the centroid similarity search index and the clustering module without needing to modify other steps.

5. The method of claim 3, wherein the specified distance is a Euclidean distance.

6. The method of claim 3, wherein the specified distance is cosine similarity.

7. The method of claim 1, wherein an age parameter of a cluster is a most recent time that any vector of an item was added to the cluster.

8. The method of claim 1, wherein the method further comprises adding, using one or more computers, the vector to a filtered cluster that is most similar of the filtered clusters to the vector.

9. The method of claim 8, wherein each of the filtered clusters has a centroid and wherein the method further comprises determining, using one or more computers, which of the filtered clusters is most similar to the vector based at least in part by determining which of the centroids of the filtered clusters is closest to the vector.

10. The method of claim 1, wherein the method further comprises adding, using one or more computers, the vector to a filtered cluster that has a smallest distance of the filtered clusters to the vector.

11. The method of claim 10, wherein each filtered cluster has a centroid and wherein determining which of the filtered clusters has a smallest distance of the filtered clusters to the vector comprises determining, using one or more computers, which of the centroids of the filtered clusters has the smallest distance to the vector.

12. The method of claim 1, wherein the new cluster has a new cluster centroid, wherein creating a new cluster comprises adding, using one or more computers, the new cluster centroid to a centroid similarity search index using the vector of the item as the new cluster centroid and wherein creating a new cluster further comprises reassigning, using one or more computers, an old item having a current cluster with a current cluster centroid, the reassigning occurring when the item is closer to the new cluster centroid than to the current cluster centroid.

13. The method of claim 1, wherein the method further comprises merging, using one or more computers, clusters in the neighborhood of clusters that are closer than a specified distance and splitting, using one or more computers, clusters in the neighborhood of clusters that have a radius above a specified metric.

14. The method of claim 1, wherein the method further comprises
   receiving, using one or more computers, an update to an old item turning the old item into a new item;
   determining, using one or more computers, an existing cluster for the old item;
   removing, using one or more computers, the old item from the existing cluster;
   applying, using one or more computers, a clustering module to items remaining in the existing cluster; and
   adding, using one or more computers, the new item to a new cluster.

15. The method of claim 1, wherein the method further comprises providing, using one or more computers, an administrator with cluster membership data and receiving, using one or more computers, clustering parameters from the administrator after providing the administrator with the cluster membership data.

16. The method of claim 1, wherein the obtaining, filtering, creating and storing steps are performed only upon receipt of an item.

17. The method of claim 1, wherein the obtaining, filtering, creating and storing steps are performed in less than a second.

18. A method comprising:
   receiving, using one or more computers, a vector representing an item;
   in response to receiving the vector:
      selecting, using one or more computers, clusters within at least one specified metric of the vector and based at least in part on an age parameter of the clusters to determine selected clusters;
      determining, using one or more computers and based on the received vector, that there are no selected clusters;
      based on a determination that there are no selected clusters, creating, using one or more computers, a new cluster based at least in part on the item; and
      storing, using one or more computers, new cluster data for the new cluster, wherein the selecting, creating and storing steps are performed in near real-time from receipt of the vector;
   receiving, using one or more computers, a request for cluster data; and
   providing, using one or more computers, cluster data including the new cluster data in response to the request.

19. The method of claim 18, wherein the method further comprises adding, using one or more computers, the vector to a filtered cluster that is most similar of the filtered clusters to the vector.

20. The method of claim 18, wherein the method further comprises adding, using one or more computers, the vector to a filtered cluster that has a smallest distance of the filtered clusters to the vector.

21. A system comprising:
   one or more computers and one or more storage devices on which are stored instructions that are operable, when executed by the one or more computers, to cause the one or more computers to perform operations comprising:
      receiving, using the one or more computers, a vector representing an item;
      in response to receiving the vector:
         obtaining, using the one or more computers, clusters within at least one specified metric of the vector;
         filtering, using the one or more computers, the clusters based at least in part on an age parameter of the clusters to determine filtered clusters;
         determining, using the one or more computers and based on the received vector, that there are no filtered clusters;
         based on a determination that there are no filtered clusters, creating, using the one or more computers, a new cluster based at least in part on the item; and
      storing, using the one or more computers, new cluster data for the new cluster, wherein the obtaining, filtering, creating and storing steps are performed in near real-time from receipt of the vector;
   receiving, using the one or more computers, a request for cluster data; and
   providing, using the one or more computers, cluster data including the new cluster data in response to the request.

* * * * *